C. L. DAWSON.
INNER TUBE FOR PNEUMATIC TIRES.
APPLICATION FILED DEC. 22, 1913.
1,138,544.
Patented May 4, 1915.
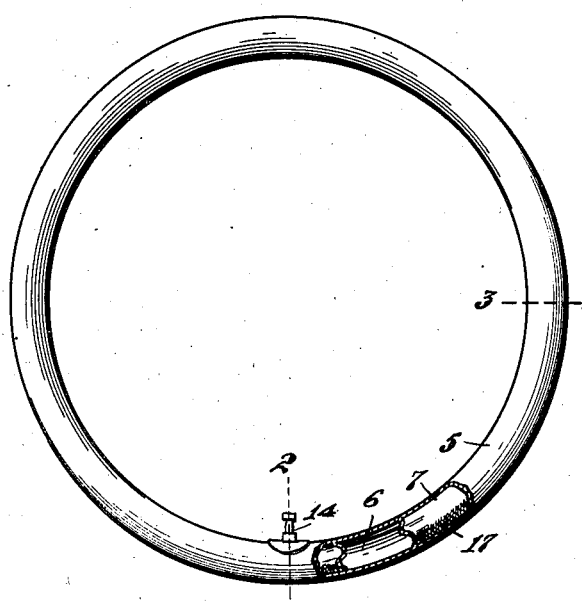
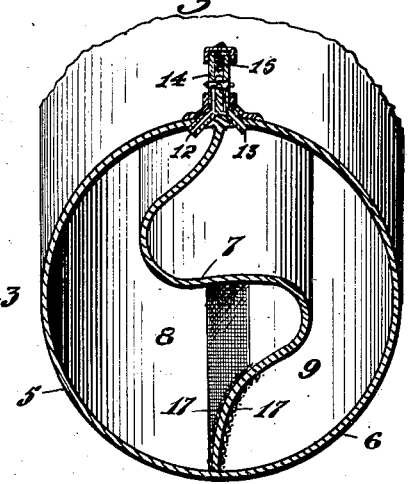
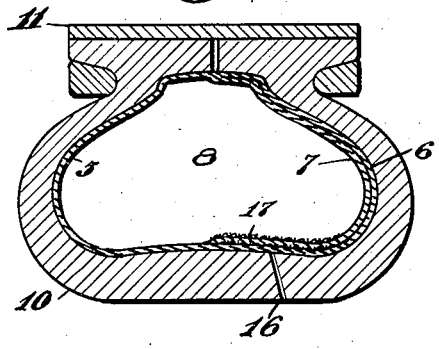
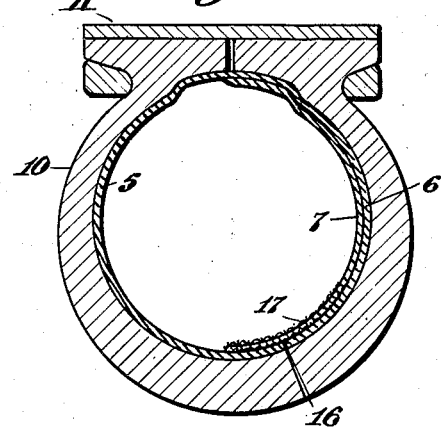
Witnesses:
Inventor
Clarence L. Dawson

UNITED STATES PATENT OFFICE.

CLARENCE L. DAWSON, OF LOS ANGELES, CALIFORNIA.

INNER TUBE FOR PNEUMATIC TIRES.

1,138,544. Specification of Letters Patent. Patented May 4, 1915.

Application filed December 22, 1913. Serial No. 808,126.

*To all whom it may concern:*

Be it known that I, CLARENCE L. DAWSON, a citizen of the United States, residing at Los Angeles, in the county of Los Angeles, State of California, have invented new and useful Improvements in Inner Tubes for Pneumatic Tires, of which the following is a specification.

This invention relates to an inflatable inner tube for pneumatic tires, and the principal object is to provide means in an inflatable tube whereby a puncture or leak in the walls of the tube can be quickly closed and the tube reinflated, which means includes a circumferentially extending flexible partition wall within the tube dividing the interior of the tube into two equal compartments.

Another object is to provide a reinforcement for the partition walls, adjacent to the tread portion, for rendering it difficult of puncture.

The invention primarily resides in an annular resilient tube having a central circumferentially extending partition wall therein dividing the interior of the tube into two equal annular compartments, and valved inlet ports formed in the tube communicating with each of the compartments therein.

The invention further consists of the parts and the combination and construction of parts as hereinafter more fully described and claimed, having reference to the accompanying drawings, in which, Figure 1 is a view in side elevation of the inner tube, with portions broken away, showing the flexible partition wall therein. Fig. 2 is an enlarged detail section on the line 2—2 of Fig. 1, showing the tube as inflated equally on opposite sides of the partition. Fig. 3 is an enlarged detail section on the line 3—3 of Fig. 1, showing the tire as deflated and illustrating the manner of constructing same. Fig. 4 is a detail view illustrating the tube as applied to a pneumatic tire and showing the partition member of the tube as disposed against the side wall of the tube to close a puncture and showing the tire as partially inflated by the air in one of the inner tube compartments. Fig. 5 is a similar view showing one of the compartments deflated and the other inflated to fully inflate the outer tire.

In the ordinary construction and application of inner tubes for pneumatic tires considerable difficulty has been met in sealing punctures in the inner tube. By providing the tube with a central flexible partition as herein shown and described this difficulty is largely obviated, as the partition wall can be temporarily employed for sealing a puncture in the outer wall of the tube by inflating the annular compartment on the side of the partition opposite the puncture.

In the drawings, 5 and 6 indicate the two annular halves of an inner tube which are formed of any suitable resilient material such as rubber or composition as commonly employed in the construction of inner tubes for pneumatic tires. In carrying out the present invention a third annular member 7 is provided, which member is preferably of a resilient character and conforms to the members 5 and 6 of the tube. This member 7 is interposed between the members 5 and 6 as illustrated in Fig. 3, and the peripheral edges of the members 5, 6 and 7 are vulcanized together to form an integral structure which, when inflated equally on opposite sides of the member 7 will form annular compartments 8 and 9, as shown in Figs. 1 and 2. The members 7 will thus form a flexible partition wall circumferentially in the interior of the tube; the outer edge of the partition wall extending adjacent the extreme outer periphery of the tube, which portion of the tube lies centrally of the tread portion of the outer casing 10. The inner edge of the partition 7 will extend along the inner periphery of the tube centrally of the wheel rim 11 on which the tire 10 is mounted. Each of the compartments 8 and 9 communicate through passages 12 and 13, respectively, with a valve casing 14 in which the usual check valve 15 is mounted, through which valve the compartments 8 and 9 can be inflated simultaneously by the introduction therein of air under pressure. It is manifest that any suitable valve construction may be employed as desired.

In the application of the invention the inner tube is inserted in the tire 10 in the usual manner and is inflated equally on opposite sides of the partition wall 7, the tube then assuming a shape approximately like that shown in Fig. 2, with the partition wall extending substantially vertical in relation to the tread adjacent thereto. A puncture of the outer walls 5 or 6 of the inner tube, such as might be occasioned by the picking up of nails, tacks or the like by the tire 10, would almost necessarily lead into one or the other of the compartments 8 or 9 by reason of the narrow width of the connection between the partition 7 and the tube. A puncture of this character is indicated at 16 in Fig. 4. Such a puncture would allow the air under pressure on one side of the partition 7 to escape, thus reducing the pressure on one side of the partition 7 and permitting the compressed air on the opposite side of the partition to expand. When the air on the punctured side of the casing is sufficiently exhausted, the air pressure on the opposite side of the flexible partition 7 will force the latter against the punctured wall of the inner tube, as shown in Fig. 4, thereby closing the puncture and preventing the complete deflation of the inner tube, the air within the unpunctured compartment serving to retain the tube in a partly inflated condition so that the vehicle carrying the tire can be run a considerable distance without cutting the tire on the wheel rim and without stopping for repair of the tire. By completely exhausting the punctured compartment the opposite compartment may be inflated to the full extent of the inner tube, thereby causing the partition wall 7 to expand against the inner face of the punctured half of the tube as shown in Fig. 5; the tire then being fully inflated by the air in one compartment.

As a means for preventing the partition 7 from being punctured by a nail, tack or the like picked up by the tire 10, the partition 7 is covered on opposite sides adjacent the tread with a reinforcing and protective fabric 17 of any suitable material; this fabric also serving to slightly stiffen this portion so as to normally retain it approximately at right angles to the tread adjacent its juncture with the tube 3. In practice the reinforcing fabric extends on the partition wall a distance substantially corresponding to one-half the width of the tread so as to project over the area most subject to puncture when the partition is positioned against the wall of the tube.

By providing an inner tube as just described the necessity of removing the inner tube for repairs is greatly diminished by reason of the inner wall operating to seal an initial puncture.

What I claim is:

1. An inner tube for pneumatic tires, comprising the combination of an annular resilient tube, an annular resilient partition within the tube forming the inside of the tube into two equal circumferentially extending compartments, said partition consisting of a continuous strip of resilient material of a width approximately corresponding to one-half the inner circumference of the tube and a reinforcing fabric on the partition adjacent its connection with the outer portion of the tube, said reinforcing fabric acting to normally maintain the outer portion of the wall approximately at right angles to the tube.

2. An inner tube for pneumatic tires, comprising an annular resilient tube, a central circumferentially extending partition wall in said tube, said wall formed of flexible material and of a width approximately that of one-half the transverse periphery of the tube, and protective fabric on the outer faces of the partition adjacent its juncture with the outer periphery of the tube and extending a distance on the partition wall corresponding to one-half the width of the tread.

In witness that I claim the foregoing I have hereunto subscribed my name this 25th day of November, 1913.

CLARENCE L. DAWSON.

Witnesses:
R. S. BERRY,
MARIE BATTEY.